(12) United States Patent
Nassar et al.

(10) Patent No.: US 7,360,435 B2
(45) Date of Patent: Apr. 22, 2008

(54) ULTRASONIC CONTROL OF BOLT TIGHTENING

(75) Inventors: Sayed Nassar, Northville, MI (US); Gerald Grzadzinski, Sterling Heights, MI (US)

(73) Assignee: Chrysler LLC, Auburn Hills, MI (US)

( * ) Notice: Subject to any disclaimer, the term of this patent is extended or adjusted under 35 U.S.C. 154(b) by 241 days.

(21) Appl. No.: 11/316,557

(22) Filed: Dec. 22, 2005

(65) Prior Publication Data

US 2006/0137463 A1 Jun. 29, 2006

Related U.S. Application Data

(60) Provisional application No. 60/638,938, filed on Dec. 23, 2004.

(51) Int. Cl.
*F16B 31/02* (2006.01)
*G01B 17/02* (2006.01)

(52) U.S. Cl. .................. 73/761; 702/39; 702/159
(58) Field of Classification Search .......... 73/761; 702/41–43, 79, 171, 39, 159
See application file for complete search history.

(56) References Cited

U.S. PATENT DOCUMENTS

| | | | | |
|---|---|---|---|---|
| 3,969,960 A | * | 7/1976 | Pagano | 81/429 |
| 4,062,227 A | * | 12/1977 | Heyman | 73/630 |
| 4,413,518 A | * | 11/1983 | Jones | 73/615 |
| 4,530,143 A | * | 7/1985 | Casarcia | 29/407.02 |
| 4,846,001 A | * | 7/1989 | Kibblewhite | 73/761 |
| 5,216,622 A | * | 6/1993 | Kibblewhite et al. | 700/275 |
| 6,358,051 B2 | * | 3/2002 | Lang et al. | 433/173 |
| 2002/0023503 A1 | * | 2/2002 | Schneider et al. | 73/761 |

FOREIGN PATENT DOCUMENTS

JP 60216235 A * 10/1985

OTHER PUBLICATIONS

"Reliability of Bolted Joints," Sayed A. Nassar, Ph.D., American Fastener Journal, vol. 15/No. 6, Nov./Dec. 1998, pp. 103-105.
"Controlling The Turn of The Screw," Leo O'Connor, Mechanical Engineering magazine, vol. 113/No. 9, Sep. 1991, pp. 52-56.

(Continued)

*Primary Examiner*—Edward Lefkowitz
*Assistant Examiner*—Punam Patel
(74) *Attorney, Agent, or Firm*—Ralph E. Smith

(57) ABSTRACT

Tightening of a bolt is controlled by monitoring the change in round trip time of propagating longitudinal ultrasonic waves through the bolt and the reflection of these waves at the end of the bolt. The round trip time of the longitudinal waves through bolt is continuously measured and monitored in real-time. Elongation of the bolt as it is being tightened is determined based on the change in the round trip time of the longitudinal waves, which provides the level of bolt tension and joint clamp load. In determining the bolt elongation, an elongation-dependent wave speed has been formulated and used in-real time. When the elongation of the bolt reaches a predetermined level, tightening is automatically stopped.

6 Claims, 3 Drawing Sheets

OTHER PUBLICATIONS

"Measurement of Residual Stress Using the Temperature Dependence of Ultrasonic Velocity," K. Salama, G.C. Barber and N. Chandrasekaran, Proceedings of IEEE Ultrasonic Symposium, 1982, pp. 877-884.

"Introduction to the Design and Behavior of Bolted Joints," Second Edition, Revised and Expanded, John H. Bickford, "Ultrasonic Measurement of Bolt Stretch or Tension," pp. 299-347 (1995).

"The Use of the Temperature Dependence of Ultrasonic Velocity to Measure Residual Stress," K. Salama, J.J. Wang and G.C. Barber, Review of Progress in Quantitative NDE, Plenum Press, 1982, pp. 1355-1365.

"Use of Ultrasonics in Bolted Joints," J.H. Bickford and Sayed Nassar, "Handbook of Bolts and Bolted Joints," 1998, Marcel Dekker, N.Y., N.Y., pp. 631-657.

* cited by examiner

ULTRASONIC CONTROL OF BOLT TIGHTENING

CROSS-REFERENCE TO RELATED APPLICATIONS

This application claims the benefit of U.S. Provisional Application No. 60/638,938 filed Dec. 23, 2004.

FIELD OF THE INVENTION

The present invention relates to controlling tightening of a bolt or screw in a bolted joint, and more particularly, a method and apparatus that does so based on the tension or clamp force in the bolted joint determined by monitoring the bolt elongation using ultrasonic waves propagated through the bolt and reflected at its end.

BACKGROUND OF THE INVENTION

The reliability of bolted assemblies is mainly a function of the level of the initial clamping load and the stability of the clamping load over the life of the joint. The initial level of clamping load is determined by the bolt preload achieved during the initial tightening of the bolted joint, which is often estimated based on torque level. However, the torque-tension relationship of a threaded bolt is highly sensitive to the friction variations between threads and under the turning bolt head or nut. Even moderate friction variations cause large scatter in the torque-tension correlation, which may compromise the reliability of the bolted joints for which the clamping force is estimated based solely on the torque level.

For critical applications, the bolt preload may be determined more accurately by measuring the bolt elongation caused by tightening. In contrast with the torque-tension relationship, friction plays no role in the correlation between bolt stretch and bolt tension. Bolt tension and the resulting clamping force in a bolted joint are directly proportional to the bolt elongation. So, the tightening process may be controlled by monitoring the bolt elongation. Similarly, the residual tension in a bolt remains directly proportional to the residual bolt elongation.

In the elastic range, the bolt tension F is given by $$F = K_b * \Delta l \quad (1)$$

where $K_b$ is the spring rate of the bolt (lb/in, N/mm), and $\Delta l$ is the bolt elongation. This relationship is depicted in FIG. 1.

As is known, the spring rate of the bolt, $K_b$, can be determined experimentally through a load-elongation test of the same grip length of the bolt, or by developing an analytical model that provides the bolt spring rate. Obviously, the bolt elongation that corresponds to a desired preload level depends on the grip length of the bolt. Hence, bolts with shorter grip length will experience smaller elongations, which must be measured precisely in order to reduce the percentage error in the elongation measurement. Sheet metal applications provide examples for short grip lengths. In such applications, the bolt elongation may be very small, and hence this requires high precision measurements that ultrasonic technology may offer.

With reference to FIG. 2, the main principle in using ultrasonics to measure bolt length or bolt elongation is to monitor the round trip time for a longitudinal wave 200 to travel through bolt 202 and back to a transducer 204 that is mounted on an end of the bolt 204.

Ultrasonics have been used to control bolt tightening. One such technique is discussed in Nassar et al., "Controlling the turn of the screw," Mechanical engineering magazine, vol. 113, no. 9, September 1991, pp. 52-56 (which is incorporated by reference herein in its entirety) However, this techniques involves monitoring and controlling the tightening process by using a constant, stress-independent, wave speed in order to use change in the round trip time to obtain bolt elongation. This, however, does not take into account the fact that the wave speed changes as the bolt is elongated during tightening. To compensate for this wave speed variation, this technique uses a correction factor called stress factor ("SF"), which is commonly obtained by mechanical calibration using gage blocks in a tension elongation test.

Ultrasonic wave speed is stress and elongation dependent. The speed of sound in a material is affected by the stress field. Higher stress impedes the transmission of ultrasonic waves in the bolt, making the round trip time of the wave longer. This makes the change in the bolt length appear to be larger than the actual elongation. The temperature dependence of the ultrasonic speed increases or decreases depending on whether the stress is applied parallel or perpendicular to the direction of the wave propagation.

For longitudinal waves through the bolt, only the axial stress level will cause changes in the wave speed. Stress due to shear loading or torsional stresses does not affect the sound velocity along the length of the bolt. The change in the wave speed is linear with respect to the stress level. It increases or decreases according to whether the stress is applied parallel to or perpendicular to wave propagation respectively. For a longitudinal ultrasonic wave propagating parallel to the direction of the applied axial stress, the governing equation, as discussed in "Measurement of Residual Stress Using the Temperature Dependence of Ultrasonic Velocity," K. Salama, G. C. Barber, and N. Chandrasekaran, Proceedings of IEEE Ultrasonic Symposium, 1982, p. 877, is:

$$\frac{dv}{d\sigma} = \frac{-\left(2l + \lambda + \left(\frac{\lambda+\mu}{\mu}\right)(4m + 4\lambda + 10\mu)\right)}{2v\rho(3\lambda + 2\mu)} \quad (2)$$

Where $\lambda$ and $\mu$ are lame or second-order elastic constants; l and m are Murnaghan's third-order elastic constants; $\rho$ is density, v is wave speed and $\sigma$ is the compressive stress.

Due to the fact that tightened bolts are subjected to positive tensile stress, equation (2) is rewritten for bolts as follows:

$$\frac{dv}{d\sigma} = \frac{\left(2l + \lambda + \left(\frac{\lambda+\mu}{\mu}\right)(4m + 4\lambda + 10\mu)\right)}{2\rho v(3\lambda + 2\mu)} \quad (3)$$

Equation (3) may be integrated to yield:

$$\frac{v^2 - v_0^2}{2} = \frac{\left(2l + \lambda + \left(\frac{\lambda+\mu}{\mu}\right)(4m + 4\lambda + 10\mu)\right)\sigma}{2\rho(3\lambda + 2\mu)} \quad (4)$$

where v is wave speed in stressed bolt and $v_0$ is zero stress wave speed.

In the elastic range, the axial stress σ may be expressed in terms of the axial elongation Δl as follows:

$$\frac{v^2 - v_0^2}{2} = \frac{\left(2l + \lambda + \left(\frac{\lambda + \mu}{\mu}\right)(4m + 4\lambda + 10\mu)\right)E(\Delta l/L)}{2\rho(3\lambda + 2\mu)} \quad (5)$$

where Δl/L is the axial strain of the bolt.

The wave speed is given in terms of bolt elongation and material properties by:

$$v = \left[v_0^2 + \left[\frac{E(\Delta l)\left[2l + \lambda + \left(\frac{\lambda + \mu}{\mu}\right)(4m + 4\lambda + 10\mu)\right]}{L\rho(3\lambda + 2\mu)}\right]\right]^{1/2} \quad (6)$$

The wave speed after the bolt is stressed depends on initial speed of the longitudinal wave in the bolt, bolt elongation and the material properties. In equation (6), the material properties are constant except the density of the bolt material. The initial density $\rho_0$ of the stressed segment of the bolt material is given by:

$$\text{Initial density } \rho_0 = \frac{M}{V_0} \quad (7)$$

The density ρ of the stressed segment of the bolt is given by:

$$\rho = \frac{M}{V} \quad (8)$$

The density change Δρ in the stressed segment of the bolt is given by:

$$\Delta\rho = \frac{M}{V} - \frac{M}{V_0} \quad (9)$$

In the elastic range, the change in volume per unit volume is:

$$\frac{\Delta V}{V} = \varepsilon_X + \varepsilon_Y + \varepsilon_Z \quad (10)$$

If the bolt is subjected to uniaxial stress, then stresses $\sigma_Y = \sigma_Z = 0$. The change in volume then becomes:

$$\frac{\Delta V}{V_0} = (1 - 2v)\frac{\Delta l}{L} \quad (11)$$

The change in density is then given by:

$$\Delta\rho = \frac{M}{V_0 + \Delta V} - \frac{M}{V_0} \quad (12)$$

Using equations (11) and (12), the change in density is given by:

$$\Delta\rho = -\frac{M}{V_0}\left[\frac{(1 - 2v)\Delta l}{L + (1 - 2v)\Delta l}\right] \quad (13)$$

where L is the initial length of the bolt, Δl is the elongation of the bolt, M is the mass of the stressed segment of the bolt, V is the volume of the stressed segment of the bolt, $V_0$ is the initial volume, ΔV change in bolt volume due to bolt elongation and v is Poisson's ratio.

FIG. 3 illustrates the non-dimensional change in the density of the bolt material according to equation (13). As can be seen from FIG. 3, in the elastic range, the density change is negligible.

Stress level in the bolt affects the temperature dependence of the wave speed. The effect of stress on the temperature dependence of longitudinal ultrasonic wave speed becomes much smaller, and opposite in sign, when the stress is applied parallel to the direction in which the waves are propagated.

SUMMARY OF THE INVENTION

Tightening of a bolt is controlled by monitoring the propagation of longitudinal ultrasonic waves through the bolt and the reflection of these waves at the end of the bolt. The round trip time of the longitudinal waves through bolt is continuously measured and monitored in real-time. Elongation of the bolt as it is being tightened is determined based on the change in the round trip time of the longitudinal waves, which provides the level of bolt tension and joint clamp load. When the elongation of the bolt reaches a predetermined level, tightening is automatically stopped.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
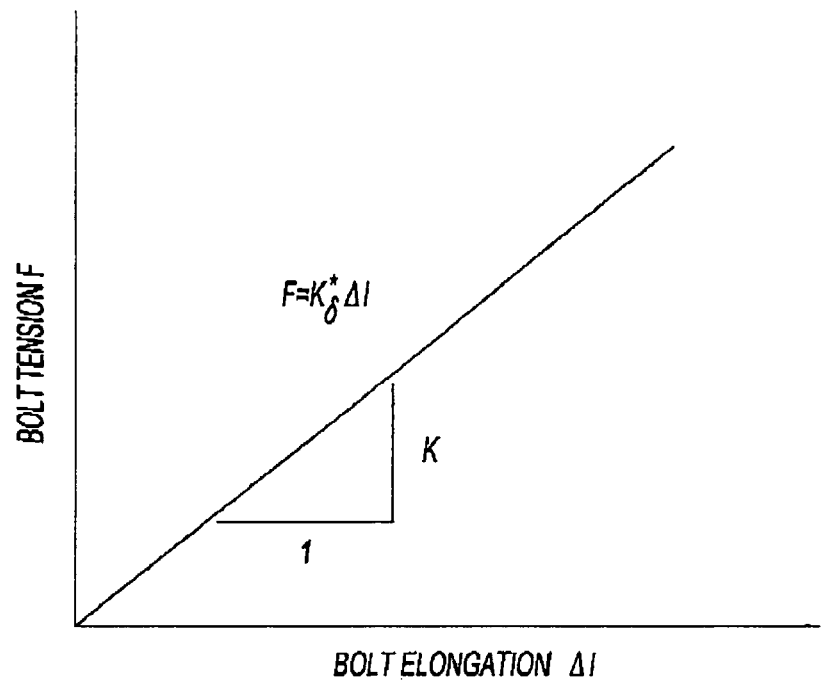
FIG. 1 is a graph showing the tension-elongation relationship for a bolt.
Figure 1:
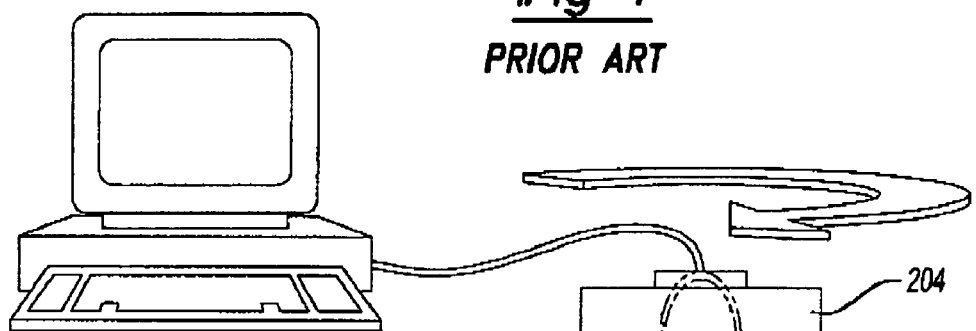
Figure 2:
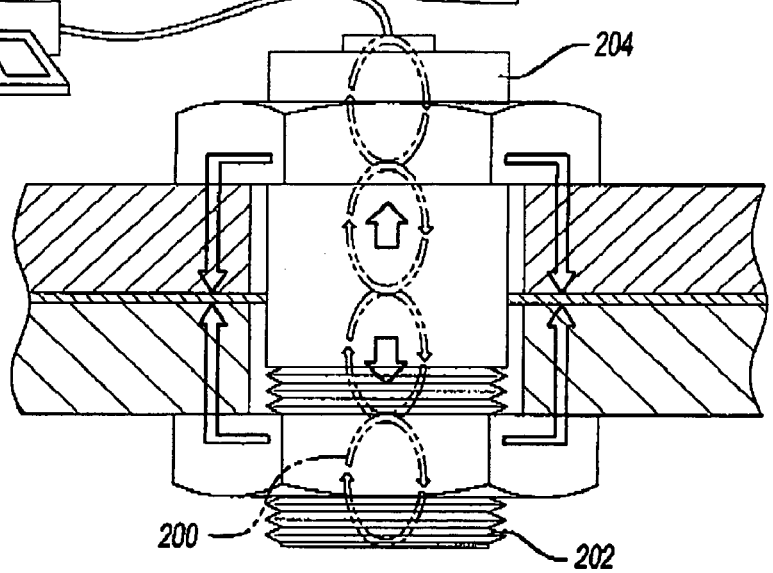
FIG. 2 is a diagrammatic representation of wave propagation in a stressed bolt.
Figure 3:
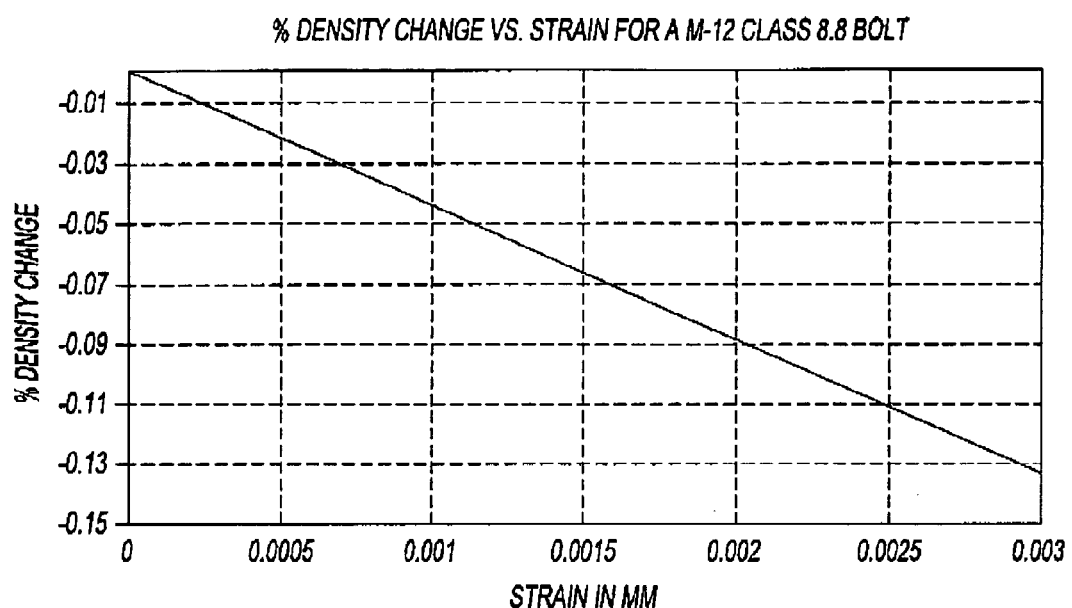
FIG. 3 is a graph showing the effect of density change in measuring strain.
Figure 4:
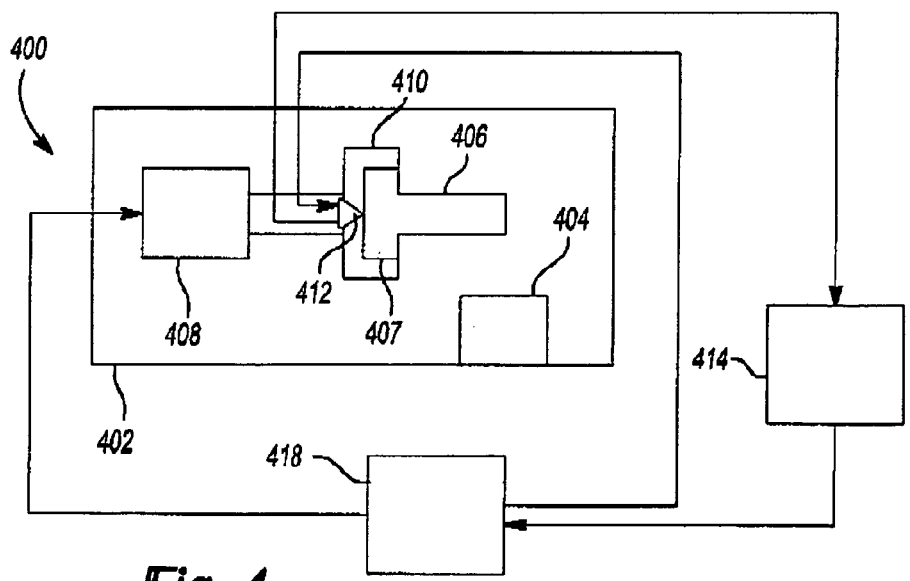
FIG. 4 is a block diagram of a bolt tightening system in accordance with an aspect of the invention.

FIG. 4 is a block diagram showing an apparatus 400 for tightening a bolt and controlling its tightening in accordance with an aspect of the invention. Apparatus 400 includes a tightening apparatus 402 including a fixture 404 for holding a work piece (not shown) in which a bolt 406 is to be tightened thus providing a bolted joint, a motor 408 that drives a socket 410 in which a head 407 of the bolt 406 is inserted to tighten bolt 406, and an ultrasonic transducer 412 is enclosed in the socket 410 and pressed against bolt head 407. Apparatus 400 may also include elements that have been included in known bolt tightening apparatuses, particularly test apparatuses, such as a torque transducer to measure the motor tightening torque, an angle encoder that measures the rotation of the bolt head and a load cell to measure the clamping load in the tightened joint (none of which are shown for purposes of clarity). Apparatus 400 further includes data acquisition device 414, such as a Krautkramer Model CL400 available from GE Inspection. Ultrasonic transducer 412 is coupled, such as through a slip ring, to data acquisition device 414. Data acquisition device 414 is coupled to a computer 418 that is part of apparatus 400.

Tightening of bolt 406 is controlled in apparatus 400 based on actual bolt elongation determined from data obtained using ultrasonic transducer 412. More specifically, computer 416 drives motor 408 to tighten bolt 406. As bolt 406 is being tightened, ultrasonic transducer 412 generates ultrasonic pulses, illustratively at a frequency of 5 MHz, that are applied to the head 407 of bolt 406. Ultrasonic transducer 412 also senses the propagation of longitudinal ultrasonic waves traveling through bolt 406 caused by these ultrasonic pulses and inputs a signal(s) to data acquisition device 414 indicative of these longitudinal ultrasonic waves. Data acquisition device 414 collects round trip time data of these longitudinal ultrasonic waves from the signal(s) input from ultrasonic transducer 412 and sends this data to computer 418, round trip time being the time for the longitudinal ultrasonic waves to travel from bolt head 407 to the end of bolt 406 and back. As bolt 406 is being tightened, the change in the wave speed of the longitudinal ultrasonic waves due to stress level change is updated by computer 418, which is programmed with a varying wave speed algorithm, discussed below, to determine actual elongation of bolt 406.

The varying wave speed program is programmed to implement an algorithm based on equation (6) above to determine the change in length of bolt 406 from the round trip time data of the ultrasonic longitudinal waves propagating in bolt 406 as bolt 406 is tightened. More specifically, round trip time in an unstretched bolt is $$\frac{2L}{v_0},$$

and the round trip time in an elongated bolt is given by $$\frac{2(L+\Delta l)}{v}.$$

The change in round trip time is thus given by:

$$\Delta t = \frac{2(L+\Delta l)}{v} - \frac{2L}{v_0} \quad (14)$$

where $\Delta t$ is change in round trip time. From equation (14) the actual change in length $\Delta l$ of the bolt is given by:

$$\Delta l = v\left(\frac{L}{v_0} + \frac{\Delta t}{2}\right) - L \quad (15)$$

The ultrasonic (apparent) change in length $\Delta l_{app}$ is expressed as $$\Delta l_{app} = v_0\left(\frac{\Delta t}{2}\right) \quad (16)$$

The ratio of mechanical (actual) change in length to the ultrasonic (apparent) change in length is called stress factor. The stress factor is given by $$\text{Stress factor} = \frac{\Delta l}{\Delta l_{app}} \quad (17)$$

Figure 5:
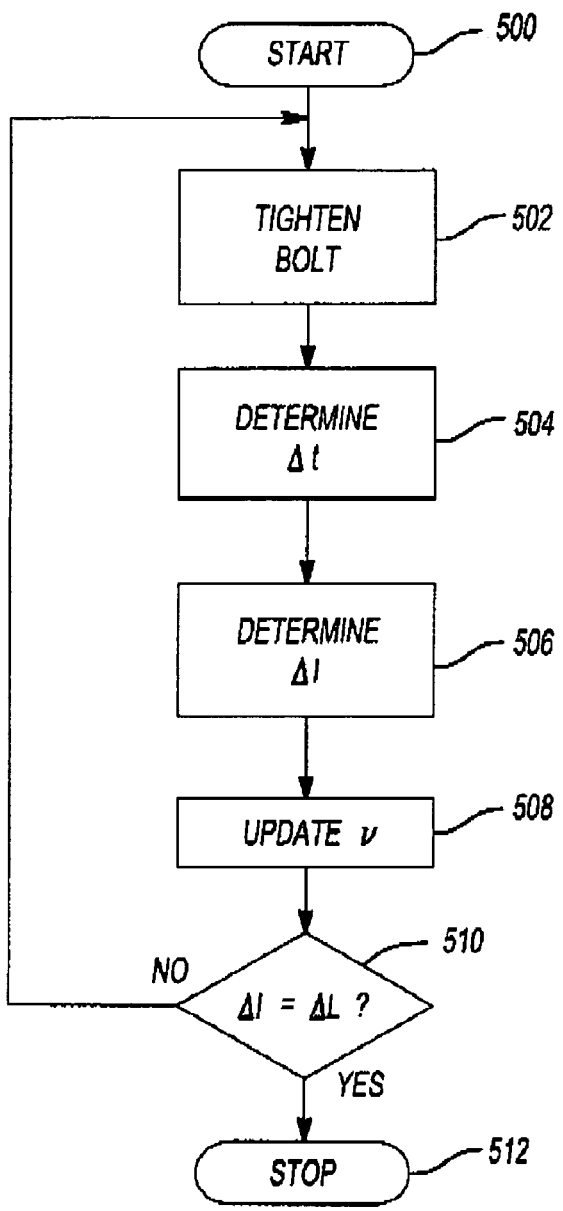
FIG. 5 is a flow chart of a program for controlling the bolt tightening system of FIG. 4.

FIG. 5 is a flow chart of a program illustratively programmed in computer 418 for controlling tightening apparatus 402. Prior to tightening a bolt, such as bolt 406, the initial length L of bolt 406 is determined and recorded in computer 418 by multiplying the known wave speed (at zero stress) of the ultrasonic longitudinal wave times one-half of the round trip time of the longitudinal wave. The program starts at 500 and at 502, computer 418 starts the tightening of bolt 406 by driving motor 408 to turn bolt 406 and bolt 406 is pulsed with ultrasonic waves, such as at 5 MHz. At 504, computer 418 determines the change $\Delta t$ in the round trip time of the ultrasonic waves using the round trip time data of the ultrasonic longitudinal waves provided by data acquisition device 414. Using equation (15), the computer 418 then determines at 506 the actual elongation $\Delta l$ of bolt 406 (i.e., the actual change in the length of bolt 406) of bolt 406. In this regard, the known wave speed $v_0$ of the ultrasonic waves in bolt 406 at zero stress is used for the wave speed v in equation (15) for the first determination of the elongation $\Delta l$ of bolt 406. The computer 418 then updates the wave speed v at 508 using equation (6), and this updated wave speed is then used when computer 418 next determines the actual bolt elongation. At 510, computer 418 checks whether the determined actual bolt elongation $\Delta l$ has reached a desired level $\Delta L$. If so, computer 418 proceeds to 512 where it stops the tightening of bolt 406. If not, it branches back to 502 and continues tightening bolt 406. $\Delta L$ is set for the specific bolt being tightened and may be determined heuristically if it is not available from reference sources. Illustratively, the longitudinal ultrasonic waves in bolt 406 are sampled fifteen-twenty times per second and computer 418 determines the actual bolt elongation and updates wave speed fifteen-twenty times per second. In measuring the bolt elongation in accordance with an aspect of the invention, a continuously updated wave speed is used; hence no calibration or Stress Factor is needed.

| NOMENCLATURE | |
|---|---|
| AMR | Angle magnification ratio |
| E | Young's Modulus of the material |
| F | Bolt tension |
| L | Initial length of the bolt |
| I | Third order elastic constant or Murnaghan's constant |
| m | Third order elastic constant or Murnaghan's constant |
| p | Thread pitch of the bolt |
| SF | Stress Factor |
| V | Volume of stressed segment of bolt |
| v | Ultrasonic wave speed in stressed bolt |
| $K_B$ | Bolt stiffness |
| $K_C$ | Joint stiffness |
| $V_0$ | Initial volume |
| $\Delta l$ | Actual change in length |
| $\Delta t$ | Change in round trip time |
| $\lambda$ | Second order elastic constant or Lamé constant |
| $\mu$ | Second order elastic constant or Lamé constant |
| $\sigma$ | Elastic stress |
| $\nu$ | Poisson's ratio |
| $v_0$ | Initial wave speed |
| $\rho_0$ | Material density |
| $\Delta \rho$ | Change in density |
| $\theta$ | Bolt head turning angle |
| $\Delta_B$ | Bolt elongation |
| $\Delta_C$ | Joint compression |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling tightening of a bolt in a joint, comprising:
   pulsing the bolt with ultrasonic pulses at an end of the bolt as it is being tightened to propagate longitudinal ultrasonic waves through the bolt that are reflected from an opposite end of the bolt;
   periodically determining a change in round trip time of the longitudinal ultrasonic waves as the bolt is tightened;
   periodically determining actual bolt elongation as the bolt is tightened based on wave speed of the ultrasonic waves and the change in the round trip time;
   periodically updating the wave speed based on the determined actual bolt elongation; and
   controlling bolt tightening in real-time based on the determined actual bolt elongation to create a desired clamp force in the joint.

2. The method of claim 1, further including periodically comparing bolt elongation with a desired bolt elongation and ceasing tightening of the bolt when the actual bolt elongation ($\Delta l$) reaches a desired bolt elongation ($\Delta L$).

3. A method of controlling tightening of a bolt, comprising:
   (a) tightening the bolt by turning it with a driving device controlled by a computer, the bolt received in a socket coupled to the driving device;
   (b) pulsing the bolt with ultrasonic pulses, from an ultrasonic transducer disposed in the socket that contacts a head of the bolt to propagate longitudinal ultrasonic waves through the bolt that are reflected from an opposite end of the bolt;
   (c) monitoring the reflected longitudinal ultrasonic waves and determining round trip time of the longitudinal ultrasonic waves for their travel through the bolt from the head of the bolt to the opposite end of the bolt and back;
   (d) determining with the computer a change in the round trip time of the longitudinal ultrasonic waves;
   (e) determining with the computer actual bolt elongation based on the change in round trip time and a wave speed of the ultrasonic waves in the bolt;
   (f) updating the wave speed based on the determined actual bolt elongation;
   (g) determining with the computer whether the determined actual bolt elongation has reached a pre-determined desired value; and
   (h) repeating steps (a)-(g) until bolt elongation has reached the desired level; and
   (i) ceasing tightening of the bolt when bolt elongation reaches the desired level.

4. An apparatus for tightening a bolt, comprising:
   a socket in which a bolt is received;
   a motor coupled to the socket;
   an ultrasonic transducer disposed in the socket that is in contact with a head of the bolt during tightening of the bolt that pulses the bolt with ultrasonic pulses to propagate longitudinal ultrasonic waves through the bolt that are reflected from an opposed end of the bolt;
   a computer that determines change in round trip time of the ultrasonic waves through the bolt as they travel from the head of the bolt to the opposed end and back, determines actual bolt elongation based on the change in round trip time and a wave speed of the ultrasonic waves, and updates the wave speed based on the determined actual bolt elongation; and
   the computer controlling the motor to control bolt tightening based on the determined actual bolt elongation.

5. The apparatus of claim 4 wherein the computer compares the actual determined bolt elongation to a desired bolt elongation and stops the motor to stop tightening the bolt when the actual determined bolt elongation reaches the desired bolt elongation.

6. The apparatus of claim 4 including a data acquisition device coupled to the ultrasonic transducer and the computer that monitors the round trip time of the ultrasonic waves and provides the round trip time to the computer.

* * * * *